US010906226B2

(12) United States Patent
Torchio et al.

(10) Patent No.: US 10,906,226 B2
(45) Date of Patent: Feb. 2, 2021

(54) PROCESS FOR THE PRODUCTION OF MULTILAYER BLOW-MOLDED HOLLOW ARTICLES

(75) Inventors: Maurizio Torchio, Alzate Brianza (IT); Claudio Minotti, Verano Brianza (IT)

(73) Assignee: Clariant Masterbatches (Italia) SpA, Pogliano Milanese (IT)

( * ) Notice: Subject to any disclaimer, the term of this patent is extended or adjusted under 35 U.S.C. 154(b) by 0 days.

(21) Appl. No.: 13/696,256

(22) PCT Filed: May 3, 2011

(86) PCT No.: PCT/EP2011/002182
§ 371 (c)(1),
(2), (4) Date: Nov. 5, 2012

(87) PCT Pub. No.: WO2011/137997
PCT Pub. Date: Nov. 10, 2011

(65) Prior Publication Data
US 2013/0059102 A1 Mar. 7, 2013

(30) Foreign Application Priority Data
May 6, 2010 (EP) .................................... 10004771

(51) Int. Cl.
B29C 49/04 (2006.01)
B65D 1/02 (2006.01)
B29C 48/92 (2019.01)
B29C 48/19 (2019.01)
B29C 48/08 (2019.01)
B29C 48/20 (2019.01)
B29K 105/16 (2006.01)
B29K 23/00 (2006.01)
B29K 105/00 (2006.01)
B29L 9/00 (2006.01)
B29L 31/00 (2006.01)

(52) U.S. Cl.
CPC .............. *B29C 49/04* (2013.01); *B29C 48/08* (2019.02); *B29C 48/19* (2019.02); *B29C 48/20* (2019.02); *B29C 48/92* (2019.02); *B65D 1/0215* (2013.01); B29C 2948/92647 (2019.02); B29K 2023/06 (2013.01); B29K 2023/065 (2013.01); B29K 2023/0625 (2013.01); B29K 2023/0633 (2013.01); B29K 2023/0641 (2013.01); B29K 2023/083 (2013.01); B29K 2023/12 (2013.01); B29K 2105/005 (2013.01); B29K 2105/0008 (2013.01); B29K 2105/0011 (2013.01); B29K 2105/0026 (2013.01); B29K 2105/0032 (2013.01); B29K 2105/0044 (2013.01); B29K 2105/16 (2013.01); B29L 2009/00 (2013.01); B29L 2031/7158 (2013.01); Y10T 428/1352 (2015.01)

(58) Field of Classification Search
CPC ......... B29L 2009/00; B29L 2031/7158; B29K 2105/16; B29K 2023/06; B29K 2023/0625; B29K 2023/0633; B29K 2023/0641; B29K 2023/065; B29K 2023/083; B29K 2023/12; B29K 2105/005; B29K 2105/0011; B29K 2105/0026; B29K 2105/0032; B29K 2105/0008; B29K 2105/0044; B65D 1/0215; B29C 47/0021; B29C 47/064; B29C 49/04; B29C 2947/92647; B29C 48/92; B29C 48/19; B29C 48/08; B29C 48/20; B29C 2948/92647; Y10T 428/1352
USPC ............................................. 428/35.7, 36.91
See application file for complete search history.

(56) References Cited

U.S. PATENT DOCUMENTS

| | | |
|---|---|---|
| 4,125,582 A | 11/1978 | Langlois |
| 4,183,673 A | 1/1980 | Easley et al. |
| 4,299,792 A | 11/1981 | Nunn |
| 5,053,176 A | 10/1991 | Cameron et al. |
| 5,232,751 A | 8/1993 | Cameron et al. |
| 5,387,381 A | 2/1995 | Saloom |
| 5,399,429 A | 3/1995 | Asrar |
| 5,489,656 A | 2/1996 | Ohtsuka et al. |
| 5,510,398 A | 4/1996 | Clark et al. |
| 5,631,085 A | 5/1997 | Gebauer |
| 5,725,814 A * | 3/1998 | Harris ......................... 264/40.3 |
| 5,840,232 A | 11/1998 | La Belle |
| 5,984,556 A | 11/1999 | Gray et al. |
| 6,046,265 A | 4/2000 | Clark et al. |
| 6,421,486 B1 | 7/2002 | Daneshver et al. |
| 6,984,425 B2 * | 1/2006 | Raymond .................... 428/35.7 |
| 8,508,365 B2 * | 8/2013 | Chen ............................ 340/540 |
| 2001/0045680 A1 | 11/2001 | Blasius et al. |
| 2003/0000909 A1 | 1/2003 | Sakaguchi et al. |
| 2003/0077347 A1 | 4/2003 | Miebach |

(Continued)

FOREIGN PATENT DOCUMENTS

| | | |
|---|---|---|
| DE | 1 933 570 | 1/1971 |
| EP | 0751071 | 1/1997 |

(Continued)

OTHER PUBLICATIONS

Written Opinion for PCT/EP2011/002182 dated Jun. 11, 2012.*

(Continued)

*Primary Examiner* — James C Yager
(74) *Attorney, Agent, or Firm* — Morgan, Lewis & Bockius LLP

(57) ABSTRACT

The present invention relates to blow molded multilayer hollow articles and a coextrusion blow molding process for the production of said multilayer hollow articles, made of thermoplastic polymers and characterized by a specific visual effect. More in particular, the present invention relates to multilayer hollow articles and a coextrusion blow molding process for the production of said multilayer hollow articles, wherein at least one layer is a continuous layer with a uniform degree of thickness and at least one layer is a discontinuous or a non-uniform continuous layer with varying degree of thickness, which results in a specific surface pattern and/or visual color effect.

17 Claims, No Drawings

(56) References Cited

U.S. PATENT DOCUMENTS

| | | | |
|---|---|---|---|
| 2005/0229993 A1* | 10/2005 | Imaizumi | B29C 47/005 138/177 |
| 2008/0241447 A1* | 10/2008 | Shi | 428/35.7 |
| 2009/0233026 A1* | 9/2009 | Akiyama et al. | 428/35.7 |
| 2013/0059102 A1* | 3/2013 | Torchio et al. | 428/35.7 |

FOREIGN PATENT DOCUMENTS

| | | |
|---|---|---|
| EP | 0931807 A2 | 7/1999 |
| EP | 0931807 A3 | 7/1999 |
| GB | 265 005 | 2/1927 |
| WO | WO 97/37825 | 10/1997 |

OTHER PUBLICATIONS

PCT International Search Report for PCT/EP2011/002182, dated Dec. 28, 2011.

PCT International Preliminary Report on Patentability for PCT/EP2011/002182, dated Nov. 6, 2012.

PCT International Search Report for PCT/US01/03044, dated Jul. 6, 2001.

English Patent Abstract of Japan 09031207, "Production of Thermoplastic Polymer Molded Product Having Marble-Like Pattern", Published Feb. 4, 1997.

English Patent Abstract of Japan 08208919, "Thermoplastic Polymer Molding Having Marbled Appearance, Its Production and Pattern-Forming Material Used Therefor", Published Aug. 13, 1996.

English Patent Abstract of Japan 06255294, "Barrel for Writing Implement", Published Sep. 13, 1994.

English Patent Abstract of Japan 58055234, "Manufacture of Resin Molding Having Marble Pattern", Published Apr. 1, 1983.

English Patent Abstract of Japan 11268470, "Writing Utensil", Published Oct. 5, 1999.

English Abstract of DE 1 933 570, Jan. 21, 1971.

\* cited by examiner

PROCESS FOR THE PRODUCTION OF MULTILAYER BLOW-MOLDED HOLLOW ARTICLES

The present invention relates to blow molded multilayer hollow articles and a coextrusion blow molding process for the production of said multilayer hollow articles, made of thermoplastic polymers and characterized by a specific visual effect. More in particular, the present invention relates to multilayer hollow articles and a coextrusion blow molding process for the production of said multilayer hollow articles, wherein at least one layer is a continuous layer with a uniform degree of thickness and at least one layer is a discontinuous or a non-uniform continuous layer with varying degree of thickness, which results in a specific surface pattern and/or visual color effect.

For the purpose of the invention, blow molded hollow articles are preferably containers, e.g. bottles.

Blow molding of thermoplastic hollow articles is conventionally performed either by blow molding of an extruded thermoplastic polymeric parison or by blow molding of a thermoplastic polymeric preform, the latter is usually injection molded from a thermoplastic polymer. The hot thermoplastic polymeric parison or the heated preform is received within a mold cavity whereupon pressurized gas provides the blow molding of the hollow article to the shape of the mold cavity.

Extrusion techniques are well known to those skilled in the art of thermoplastic polymer engineering. Plasticized thermoplastic polymers (that is, polymers heated to the point that they can flow to mold) are usually formed in a plasticizing extruder, in which pellets of the polymers are melted while being conveyed and sheered by a screw through an elongated cylinder.

Commercially available thermoplastic resins are extruded at temperatures specific to the particular resin. In order to maintain the properties of the resin, the flow temperature during extrusion must be within a pre-determined melt flow temperature range for the resin. The properties of the resin may be degraded when the resin is heated appreciably above its melt flow temperature.

In particular, coextrusion blow molding is a conventionally practiced two-step process consisting in the initial formation of multilayer tubular parisons by continuous coextrusion of at least two plasticized polymers by at least two extruders. Usually, for each layer a separate extruder is used. These extruders force the plasticized polymers into a die head with one concentric channel for each layer. Each channel in the die head has its own inlet, its own parison head and its own outlet orifice, so that the plurality of concentric polymeric tubes are combined in the die head and a final tubular parison having multiple, concentric polymeric layers is extruded from the final outlet orifice or final extrusion die of the multi-channeled die head.

U.S. Pat. No. 5,840,232 discloses in FIG. 2 an example of a multilayer die head for coextrusion blow molding for the coextrusion of a three layer parison. A first tubular layer in an inner circular channel is formed, then further down stream a second tubular layer in a middle circular channel is formed and extruded from its outlet orifice and thereby joined with or aligned onto the first tubular layer, then even further downstream, a third tubular layer in an outer circular channel is formed and extruded from its outlet orifice and thereby joined as the third layer with or aligned onto the passing tubular layer consisting of the first and second layer. Finally, this tubular three layer parison is extruded through the final extrusion orifice, i.e. the final die gap of the die head, build by the pin and the bushing. In FIG. 2 of U.S. Pat. No. 5,840,232, a converging type of dye gap is shown.

In contrast to U.S. Pat. No. 5,840,232, where the outlet orifices of the individual concentric channels are positioned sequentially one after the other in the direction of the flow with a certain distance in between each other, US 2003/0077347 A1 discloses a multilayer die head for the production of a three layer tubular parison, where the three outlet orifices of the three channels are spatially very close to each other, thereby minimizing the distance over which only two of the three layers are already jointly extruded, and one of the three layer is still missing.

In a multilayer die head, each channel for each resin flow has positioned at its beginning, i.e. positioned at its inlet, an individual parison head, into which the polymer flow from the extruder is fed. Parison heads can be distinguished by the way they form a tube from a solid melt strand. Three principal designs of parison heads are known: spider heads, mandrel heads and spiral heads.

In the spider head, also called central feed head, the core part, the so-called strainer, is held in position by little arms, the spiders.

In mandrel heads (or torpedo heads, "heart-shaped-curve heads," or cardioid heads) the solid core part (torpedo) is integrated in the basic structure of the head. These heads are also called side-fed heads. The solid melt strand is diverted into two halves, both going half way around the torpedo to meet at the opposite side. A certain amount of melt flows down through a narrow gap at the same time.

Spiral heads are side fed heads featuring several spiral grooves. The depth of these flow channels decreases, so that more and more material flows over the fillets.

The parison heads are constructed in such a way as to ensure that the inflowing polymer in a tube will be diverted into a vertical flow in the individual channel and forms a circularly completely closed tube with an even circumferential wall thickness distribution. To improve this function, various variants of these three basic types are known in literature. Each layer in a multilayer parison therefore is a circularly completely closed tube or layer; whereby it is ensured, that also in the blow molded hollow article, each layer is again circularly completely closed. This is a prerequisite in blow molding of hollow articles.

After extrusion, the parison is placed between two halves of an opened mold. By closing the mold, the parison is clamped between the two halves of the mold. Then the parison is blown up by injection of gas, i.e. air, into the interior of the clamped parison, thereby the parison expands to the shape of the interior of the mold as it is pressed against the walls of the mold cavity, forming the multilayer container. Once the parison has taken the shape of the container mold, the blow molding step is complete, the mold is opened and the container is removed from the mold for further processing.

Coextrusion provides means of incorporating the desirable properties of more than one polymer into a single structure in a single processing operation. There are however, certain limitations to the type of structures that can be produced. These limitations are generally caused by flow phenomena that occur inside the coextrusion die heads, which might affect the functionality, appearance or quality of the product. Interfacial instability and poor layer distribution are the most serious problems encountered in coextrusion. The actual cause or reason for the occurrence of these phenomena is generally attributed to large stresses at the interface of two materials caused by viscosity differences.

In common practice, processing conditions are set to match the viscosities of the polymer melts as closely as possible in order to minimize interfacial instability between adjacent polymer layers and reduce layer thickness variations.

Furthermore the extrusion rates of the individual layers are adjusted as closely as possible to each other to insure uniform and continuous layers. Also each individual channel in the die head is designed to ensure the formation of concentrically completed closed and uniform layers.

All these measures are taken to insure, that each individual channel forms a circularly completely closed tube with an even circumferential wall thickness distribution.

Another parameter that needs to be adjusted during continuous coextrusion is the speed at which the parison can be created. Parison drop time is the time it takes to fully form the parison measured from the time the head begins to form the parison. If the drop time is too long for large multilayer light weight container parisons made from polymers with low melt strength, the weight of the molten parison during formation will be greater than the melt strength and the parison will fall to the floor before the parison can be fully formed.

Nowadays, there is a desire to manufacture hollow articles not only with a specific shape and sufficient mechanical stability, but also displaying a specific visual appearance. The object of the present invention therefore was to provide blow molded hollow articles, especially containers, e.g. bottles, having a pronounced surface pattern and/or visual color effect.

Subject of the invention is a process for the production of a multilayer polymeric hollow article comprising at least two layers, whereby at least one layer is a continuous layer with a uniform degree of thickness and at least one layer is a discontinuous or a non-uniform continuous layer with varying circumferential and/or longitudinal thickness creating a pattern and/or a visual effect given by color swirls, waves, streaks and/or varying translucency, by coextrusion blow-molding in two consecutive steps, where in the first step an at least two-layer tubular parison is formed by coextrusion of at least two different thermoplastic polymers from a multilayer coextrusion die head whereby (i) the polymer forming a continuous layer with a uniform degree of thickness has a lower dynamic viscosity when passing through the coextrusion die head than the polymer forming a discontinuous or a non-uniform continuous layer; and (ii) the polymer forming a continuous layer with a uniform degree of thickness is extruded at a higher extrusion rate than the polymer forming a discontinuous or a non-uniform continuous layer, and in the second step, said parison is blow molded to form the multilayer polymeric hollow article.

Preferably, the at least one discontinuous or non-uniform continuous layer has a discontinuously varying circumferential and/or longitudinal thickness.

Expediently, the viscosity of the polymers when passing through the die head relates to the dynamic viscosity (in Pa·s) at the specific temperature in the die head.

The rate of extrusion (in kg/h) relates to the amount of material extruded through the die head in a given period of time, while the extruder is expediently operating under stable conditions, e.g. constant speed and temperature.

Preferably, the ratio of dynamic viscosity of the polymer forming a discontinuous or a non-uniform continuous layer to the dynamic viscosity of the polymer forming a continuous layer with a uniform degree of thickness when passing through the die head is of from 9.0 to 4.0, preferably of from 8.6 to 4.2, more preferably of from 8.0 to 4.4, especially of from 7.7 to 4.6.

Preferably, the rate of extrusion of the polymer forming a continuous layer with a uniform degree of thickness to the rate of extrusion of the polymer forming a discontinuous or a non-uniform continuous layer is of from 30.0 to 2.5, preferably of from 25.0 to 3.0, more preferably of from 20.0 to 4.0, especially of from 18.9 to 4.2.

Preferably, the co-extrusion blow molding process is performed by using an extrusion blow molding machine to form a multilayer hollow container, wherein the blow molding machine comprises at least two separate extruders, wherein the at least two thermoplastic polymers are molten and fed into a die head, where the molten thermoplastic polymers are brought together as separate polymeric streams and extruded through a slit shaped like a circle to form a single tubular parison made of concentrically arranged layers.

Preferably, the parison head of each channel in the multilayer coextrusion die head, is a mandrel head or a spiral head, more preferably, it is a mandrel head.

The tubular parison made of concentrically arranged layers is then enclosed between two halves of a mold into which the parison can be air-blown to take the shape of the mold as the plastic contacts the mold cavity, forming the multilayer hollow article.

For the purpose of the invention, multilayer structures consist of at least two consecutive layers made of thermoplastic polymers, namely the outside and the inside layer, with optionally one or more additional and consecutive middle or intermediate layers located between the outside and the inside layers.

For the purpose of the invention, "outside" layer means the outermost layer of a plurality of concentrically arranged layers simultaneously coextruded through a multilayer coextrusion die head; the outside layer in the die head will be the outside layer in the extruded tubular parison and, in case of multilayer hollow blow molded articles, the outside layer will be the layer that forms the external surface of a hollow article.

"Inside" layer means the innermost layer of a plurality of concentrically arranged layers simultaneously coextruded through a multilayer coextrusion die head; the inside layer in the die head will be the inside layer in the extruded tubular parison and, in case of multilayer hollow blow molded article, the inside layer will be the layer that forms the internal surface of a blow molded hollow article.

"Middle" or "intermediate" layer means any layer between the outside and the inside layer of a multilayer structure.

Therefore both the outside and the inside layer have only one of their two principal surfaces directly adhered to another layer of the structure, whereas any middle or intermediate layer has both of its principal surfaces directly adhered to another layer of the multilayer structure.

For the purpose of the invention, layer A, comprising the polymer A, is the outside layer; layer C, comprising the polymer C, is the inside layer; and, any layer B, comprising the polymer B, is the middle layer of a multilayer structure.

Any outside, middle and inside layer of the multilayer parison and container can be circumferentially closed with uniform or non-uniform wall thickness along the circumferential direction or along the longitudinal direction (direction of extrusion). For the purpose of the invention, non-uniform layer thickness means that the layer thickness may vary along the circumference and/or along the longitudinal direction of the multilayer parison and container. Non-uniformity can also mean that the layer may become discontinuous, that is the circumferential and/or longitudinal layer thickness becomes zero in one or more parts of the parison or of the container and is interrupted by any of the additional other layers of the parison or of the container.

In a preferred embodiment of the invention, a two-layer parison is formed from a bi-layer coextrusion die head fed by two separate extruders conveying two thermoplastic polymers A and C.

In one embodiment, polymer A has a lower viscosity than polymer C and is extruded at a higher speed than polymer C, giving rise to a container having a uniform continuous outside layer A and a non-uniform inside layer C.

In another embodiment, polymer C has a lower viscosity than polymer A and is extruded at a higher speed than polymer A, giving rise to a container having a uniform continuous inside layer C and a non-uniform outside layer A.

In another preferred embodiment of the invention, a three-layer parison is formed from a tri-layer extrusion die head fed by three separate extruders conveying three thermoplastic polymers A, B, and C.

In one embodiment, polymer A has a lower viscosity than polymer B and polymer C and is extruded at a higher speed than polymer B and C, giving rise to a container having a uniform continuous outside layer A and a non-uniform inside layer C and a non-uniform middle layer B.

In another embodiment, polymer B has a lower viscosity than polymer A and polymer C and is extruded at a higher speed than polymer A and polymer C, giving rise to a container having a uniform continuous middle layer and a non-uniform inside layer C and a non-uniform outside layer A.

The parison formed in each of the above described embodiments is then blow molded to form the bi- or three-layer polymeric hollow article, e.g. a container, e.g. a bottle.

In principle, the viscosity of said thermoplastic polymers can be controlled by the nature of the polymer itself, by the temperature in the die head, and by the addition of further ingredients such as solvents or polymer additives such as described below under "substances F".

The present invention further relates to a multilayer blow-molded hollow article made of thermoplastic polymers and characterized by a pattern and/or a visual effect given by color swirls, waves, streaks and/or varying translucency, whereby at least one layer is a continuous layer with a uniform degree of thickness, and at least one layer is a discontinuous or a non-uniform continuous layer with varying circumferential and/or longitudinal thickness.

Subject of the present invention is also a multilayer blow-molded hollow article manufactured according to the process of the invention as herein described.

Multilayer article means an at least two-layer article, preferably, a two, three, four or five layer article.

The non-uniform layer can be a discontinuous layer or a continuous layer, both having a varying circumferential and/or longitudinal thickness. The varying circumferential and/or longitudinal thickness is preferably discontinuously varying.

In one preferred embodiment of the invention, the article is a two-layer container having an outside layer A and an inside layer C.

In one embodiment thereof, the container has a uniform continuous outside layer A and a non-uniform inside layer C.

In another embodiment thereof, the container has a uniform continuous inside layer C and a non-uniform outside layer A.

In a further embodiment of the invention, the article is a three-layer container having an outside layer A, a middle layer B and an inside layer C.

In one embodiment thereof, the container has a uniform continuous outside layer A and a non-uniform inside layer C and a non-uniform middle layer B.

In another embodiment thereof, the container has a uniform continuous middle layer B and a non-uniform inside layer C and a non-uniform outside layer A.

In all embodiments described herein, the layer having a uniform circumferential and longitudinal wall thickness serves as the structure building and structure supporting layer providing for the shape and physical strength of the hollow blow molded article. The wall thickness of the uniform layer is preferably of from 0.1 to 5 mm, more preferably of from 0.5 to 3 mm.

The wall thickness of a non-uniform layer forming the pattern and/or the visual effects can be of from 0 to 5 mm, preferably of from 0 to 3 mm.

Examples of a pattern formed by the process of the invention are areas with droplet-like elevations, crater-like cavities, grooves, ridges, streaks or swirls.

Examples of visual effects can be said patterns as well as streaks, waves and/or swirls caused by varying color or varying translucency.

The blow molded hollow article, e.g. container, e.g. bottle, can have any size and shape which is producible by a blow molding process.

The thermoplastic polymers A, B and C may be the same or different and are preferably selected from the group consisting of polyolefins, polyolefin copolymers and polystyrenes, more preferably of polyethylene (PE), preferably selected from the group consisting of high density polyethylene (HDPE), medium density polyethylene (MDPE), low density polyethylene (LDPE), linear low density polyethylene (LLDPE), metallocene low density polyethylene (mLDPE) and metallocene linear low density polyethylene (mLLDPE), polypropylene (PP), preferably selected from the group consisting of polypropylene homopolymer (PPH), polypropylene random copolymer (PP-R) and polypropylene block copolymers (PP-block-COPO), polyolefin plastomers, preferably polymers of 1-octene with ethylene, PE copolymers, preferably selected from the group consisting of ethylene-vinyl acetate copolymers (EVA), copolymers of ethylene and methyl acrylate (EMA), copolymers of ethylene and butyl acrylate (EBA), copolymers of ethylene and ethyl acrylate (EEA), and cycloolefin copolymers (COC), general purpose polystyrene (GPPS) and high impact polystyrene (HIPS); even more preferably of high density polyethylene (HDPE), low density polyethylene (LDPE), linear low density polyethylene (LLDPE), polypropylene homopolymer (PPH), polypropylene random copolymer (PP-R) and polypropylene block copolymers (PP-block-COPO), ethylene-vinyl acetate copolymers (EVA), copolymers of ethylene and methyl acrylate (EMA), general purpose polystyrene (GPPS);

particularly preferably of
high density polyethylene (HDPE), medium density polyethylene (MDPE), linear low density polyethylene (LLDPE),
polypropylene homopolymer (PPH) and polypropylene random copolymer (PP-R).

Any inside, outside and/or middle layer may contain one or more colorants such as pigments or dyes.

Methods for incorporating colorants into the polymer of the layer are well known to those skilled in the art.

Preferably, at least one layer comprises a colorant P.

For the purpose of the invention, colorant P is any pigment or dye, which imparts a coloristic effect such as color, brightness, transparency, translucency or opacity. For the purpose of the invention, translucency is defined as a partial opacity or a state between complete transparency and complete opacity.

The colorant P can consist of more than one pigment and/or dye, preferably, the colorant P consists of one, two, three, four or five pigments and/or dyes.

If more than one layer contains a colorant P, the colorant P in the individual layers can be the same or different.

The colorant P is preferably selected from the group consisting of natural colorants, preferably derived from plants or animals, synthetic colorants, preferred synthetic colorants being synthetic, organic and inorganic, dyes and pigments,
preferred synthetic organic pigments are selected from the group of azo pigments, disazo pigments, laked azo pigments, laked disazo pigments, polycyclic pigments, particularly preferably polycyclic pigments are phthalocyanine, diketopyrrolopyrrole, quinacridone, perylene, dioxazine, anthraquinone, thioindigo or quinophthalone pigments;
preferred synthetic inorganic pigments are selected from the group consisting of carbon black, metal oxides, mixed oxides, silicates, metal sulphates, chromates, metal powders, pearlescent pigments, luminescent pigments, more preferably carbon black, titanium oxides, cadmium pigments, lead pigments, iron oxides, nickel titanates, aluminium sulphates, barium sulfates, cobalt based pigments, mica based pearlescent pigments and chromium oxides.

A preferred embodiment of the invention is a two-layer blow molded hollow article having a uniform continuous outside layer A made of a transparent or translucent polymer, and having a non-uniform inside layer C, none of the two layers comprising a colorant P.

Another preferred embodiment of the invention is a two-layer blow molded hollow article having a uniform continuous outside layer A made of a transparent or translucent polymer, and having a non-uniform inside layer C, with only the inside layer comprising a colorant P.

Another preferred embodiment of the invention is a two-layer blow molded hollow article having a uniform continuous outside layer A made of a transparent or translucent polymer, and having a non-uniform inside layer C, with both the inside and the outside layer comprising each a colorant P, which can be the same or different.

Another preferred embodiment of the invention is a three-layer blow molded hollow article having a uniform continuous outside layer A made of a transparent or translucent polymer, and having a non-uniform middle layer B and a non-uniform inside layer C, with only the middle and inside layers comprising each a colorant P, which can be the same or different. The polymers of the outside, middle and inside layers can be the same or different, preferably the polymers are different.

Another preferred embodiment of the invention is a three-layer blow molded hollow article having a uniform continuous middle layer B made of a transparent or translucent polymer, and having a non-uniform outside layer A and a non-uniform inside layer C, with only the outside and inside layers comprising each a colorant P, which can be the same or different. The polymers of the outside, middle and inside layers can be the same or different, preferably the polymers are different.

Any of the layers of the blow molded multilayer hollow article optionally contains one or more further substances F, the substance F being selected from the group consisting of
fillers, preferably silica, zeolites, silicates, particularly preferably aluminium silicates, sodium silicate, calcium silicates; chalk or talc; metal hydrates; the fillers can be nanosized fillers;
auxiliaries, preferably acid scavengers, processing aids, coupling agents, lubricants, stearates, blowing agents, polyhydric alcohols, nucleating agents, peroxides, or antioxidants, e.g. stearates, or oxides such as magnesium oxide;
antioxidants, preferably primary or secondary antioxidants;
antistatic agents, preferably glycerol stearates, glycerol monostearates, alkylamines, fatty acid mixtures, amines, ethoxylated amines, alkylsulphonates, glycerol esters or mixtures (blends) thereof;
UV absorbers, slip agents, anti-fogging agents, anti-condensation agents and/or suspension stabilizers, flame retardants, biocides, slip and anti-blocking agents, blowing agents, nucleating agents, waxes; and mixtures thereof.

In all embodiments described above containing a colorant P and/or a substance F, it is expedient to introduce colorant P and/or substance F in the form of a masterbatch into the polymer of the respective layer before starting the coextrusion blow molding process of the invention. The introduction of the masterbatch into the polymer can be performed by any customary mixing process such as kneading or extruding.

Masterbatches (MB) are compositions comprising one or more polymeric carriers and one or more further substances, these further substances being one or more additives and/or one or more colorants such as pigments or dyes, where these further substances are present in the masterbatch in higher concentrations than in the final application or in the final article, and where the carrier or the carriers do not necessarily have to be the organic polymer of the final application or of the final article. Preferred concentrations of the additives in a masterbatch range preferably from 0.5 to 90% by weight, more preferably from 1 to 80% by weight, the % by weight based in each case on the total weight of the masterbatch. Preferred concentrations of the colorants in a masterbatch range preferably from 0.5 to 80% by weight, more preferably from 1 to 60% by weight, the % by weight based in each case on the total weight of the masterbatch.

Surprisingly, the deviation from the normally strictly observed process parameters such as equal extrusion rate and equal or similar viscosities, allows the production of blow molded hollow articles with appealing visual effects and/or patterns given by color swirls and streaks in at least one layer of the multilayer structure.

Test Methods:

The product properties are determined by the following methods, unless indicated otherwise:

Values of density or specific gravity (g/cm$^3$) are according to the manufacturers' specification and determined in accordance with ASTM D1505, ISO 1183 or with ASTM D792.

Values of melt flow rate (MFR) (g/10 min at specified temperature and weight) are according to the manufacturers' specification and determined in accordance with ASTM D1238 or with ISO 1133.

Measurement method for the viscosity (η) (Pascal-second; Pa·s):

Dynamic viscosity data have been measured at temperatures corresponding to the respective temperature profile of the extruders (see Table 2 for details) using a capillary rheometer and in accordance to standard ASTM D3835.

Measurement method for the rate of extrusion (kg/h) consists of weighting the amount of material extruded in a given period of time, while the extruder is operating under stable conditions; the weighting is repeated 5 times and the results are averaged.

EXAMPLES

% by weight are based on the total weight of the mixture, composition or article; parts are parts by weight;

LDR means "let-down ratio" and indicates the masterbatch dilution in the finished product; it is expressed in terms of % by weight of masterbatch based on the total weight of the mixture;

"ex" means example; MB means masterbatch;

L/D describes the relative length of the extruder screw in terms of the length of the screw from the forward edge of the feed opening to the forward end of the screw flight divided by the screw diameter; the ratio is expressed with its denominator reduced to 1; for example, a 24/1 screw has a screw length 24 times its diameter.

Substances Used:

Component A0:

Low density polyethylene (LDPE) having a density of 0.919 g/cm$^3$ (ISO 1183) and MFR of 8.0 g/10 min (ISO 1133; measured at 190° C./2.16 kg).

Component A1 or B1 or C1:

Low density polyethylene (LDPE) having a density of 0.924 g/cm$^3$ (ASTM D1505) and MFR of 2.2 g/10 min (ASTM D1238; measured at 190° C./2.16 kg).

Component A2 or B2 or C2:

High density polyethylene (HDPE) having a density of 0.960 g/cm$^3$ (ISO 1183) and MFR of 0.3 g/10 min (ISO 1133; measured at 190° C./2.16 kg).

Component A3 or B3 or C3:

High-gloss, high density polyethylene (HDPE) having a density of 0.957 g/cm$^3$ (ISO 1183) and MFR of 1.1 g/10 min (ISO 1133; measured at 190° C./2.16 kg).

Component A4 or B4 or C4:

High density polyethylene (HDPE) having a density of 0.960 g/cm$^3$ (ISO 1183) and MFR of 8.0 g/10 min (ISO 1133; measured at 190° C./2.16 kg).

Component A5 or B5 or C5:

Polypropylene homopolymer (PPH) having specific gravity of 0.903 g/cm$^3$ (ASTM D792) and MFR of 11 g/10 min (ASTM D1238; measured at 230° C./2.16 kg).

Component A6 or B6 or C6:

Polypropylene random copolymer (PP-R) having density of 0.900 g/cm$^3$ (ISO 1183) and MFR of 1.8 g/10 min (ISO 1133; measured at 230° C./2.16 kg).

Component A7 or B7 or C7:

Highly-transparent polypropylene random copolymer (PP-R) having density of 0.905 g/cm$^3$ (ISO 1183) and MFR of 8 g/10 min (ISO 1133; measured at 230° C./2.16 kg).

Component P1:

C.I. Pigment Blue 15:3 (C.I. No. 74160).

Component P2:

C.I. Pigment Brown 24 (C.I. No. 77310).

Component P3.

C.I. Pigment Red 101 (C.I. No. 77491).

Masterbatches MB1 to MB3

The components were homogenized together on a twin screw extruder at a temperature of 160 to 220° C. and the color concentrates MB1 to MB3 were obtained; Table 1 gives the details.

TABLE 1

| MB | Components used [parts] | |
|---|---|---|
| | colorant | polymeric carrier |
| MB1 | P1 [38] | A0 [62] |
| MB2 | P2 [60] | A0 [40] |
| MB3 | P3 [60] | A0 [40] | ex 1 to ex 22

Bi-layer and tri-layer bottles were prepared on a multi-layer blow molding machine Magic® MP IB500/ND equipped with three separate extruders 1, 2 and 3 each having a relative screw length L/D of 24 and a coextrusion multilayer die head with feedblock design and with a maximum annular diameter of 43 mm. Extruder 1 operates with the polymer A forming the outside layer, extruder 2 operates with the polymer B forming an optional middle layer and extruder 3 operates with the polymer C forming the inside layer of the multilayer hollow article with polymers A, B or C optionally mixed with color concentrates MB1 to MB3 in order to impart color to one or more than one layer of the multilayer hollow article. Table 2 gives the details of the temperature profile of the extruders; Table 3 gives the details of the temperature profile of the die head.

TABLE 2

| Temperature profile of extruder | Sections of an extruder [° C.] | | | | | |
|---|---|---|---|---|---|---|
| | Zone 1 (hopper) | Zone 2 | Zone 3 | Zone 4 | Zone 5 | Zone 6 (die) |
| 1E | 175 | 175 | 175 | 175 | 175 | 175 |
| 2E | 185 | 185 | 185 | 185 | 185 | 185 |
| 3E | 180 | 180 | 180 | 180 | 180 | 180 |
| 4E | 220 | 220 | 220 | 220 | 220 | 220 |
| 5E | 200 | 200 | 200 | 200 | 200 | 200 |
| 6E | 240 | 240 | 240 | 240 | 240 | 240 |

TABLE 3

| Temperature profile of die head | Sections of the die head [° C.] | | | |
|---|---|---|---|---|
| | Zone 1 (extruder) | Zone 2 | Zone 3 | Zone 4 |
| 1D | 180 | 180 | 185 | 185 |
| 2D | 185 | 185 | 220 | 220 |
| 3D | 185 | 185 | 185 | 185 |

Polymers A, B and C were homogenized and eventually mixed with the color concentrates MB1 to MB3 in the ratios reported in table 4. Table 4 also gives the measured values of the dynamic viscosity and rate of extrusion for each layer and corresponding ratios for a given example. Depending on the chosen process parameters, various visual effects and/or patterns, in at least one layer of the multilayer structure, are obtained. Such visual effects and/or patterns have been rated according to the following scale:

(+++) Very pronounced
(++) Pronounced
(+) Light

Based on the series of conducted trials, it is evident that the swirls and streaks effect is produced under a variety of conditions within the limits of the present invention.

In Table 4, ex1 to ex22, the outside layer A is a uniform continuous layer and the inside layer C is a discontinuous or non-uniform continuous layer.

TABLE 4

| ex | Outside layer (extruder profile) | Inside layer (extruder profile) | Inside layer color (LDR) | T profile die head | Rate of extrusion A [kg/h] | Viscosity A [Pa · s] | Rate of extrusion C [kg/h] | Viscosity C [Pa · s] | Ratio of Viscosity C/A | Ratio of Rate of extrusion A/C | Effect layers (effect rating) |
|---|---|---|---|---|---|---|---|---|---|---|---|
| ex 1 | A3(2E) | C2(2E) | MB1(2) | 1D | 5.87 | 3.241 | 0.611 | 18.249 | 5.631 | 9.61 | C(+++) |
| ex 2 | A3(2E) | C2(2E) | MB1(2) | 1D | 5.87 | 3.241 | 0.935 | 15.669 | 4.835 | 6.28 | C(++) |
| ex 3 | A3(2E) | C2(2E) | MB1(2) | 1D | 5.05 | 3.479 | 0.334 | 21.356 | 6.139 | 15.12 | C(+++) |
| ex 4 | A3(2E) | C2(2E) | MB1(2) | 1D | 4.48 | 3.689 | 0.168 | 25.383 | 6.881 | 26.67 | C(+) |
| ex 5 | A3(2E) | C2(2E) | MB1(2) | 1D | 4.48 | 3.689 | 0.334 | 21.356 | 5.789 | 13.41 | C(+++) |
| ex 6 | A3(2E) | C2(2E) | MB1(2) | 1D | 3.83 | 3.933 | 0.168 | 25.383 | 6.454 | 22.80 | C(+) |
| ex 7 | A3(2E) | C2(2E) | MB1(2) | 1D | 3.83 | 3.933 | 0.611 | 18.249 | 4.640 | 6.27 | C(+++) |
| ex 8 | A3(2E) | C2(2E) | MB1(2) | 1D | 3.83 | 3.933 | 0.748 | 16.803 | 4.272 | 5.12 | C(++) |
| ex 9 | A3(2E) | C2(2E) | MB1(2) | 1D | 3.17 | 4.221 | 0.168 | 25.383 | 6.014 | 18.87 | C(+++) |
| ex 10 | A3(2E) | C2(2E) | MB1(2) | 1D | 2.58 | 4.574 | 0.168 | 25.383 | 5.549 | 15.36 | C(+++) |
| ex 11 | A7(2E) | C6(2E) | MB1(2) | 3D | 5.72 | 1.783 | 0.63 | 13.812 | 7.746 | 9.08 | C(+) |
| ex 12 | A7(2E) | C6(2E) | MB1(2) | 3D | 5.72 | 1.783 | 0.79 | 12.783 | 7.169 | 7.24 | C(+++) |
| ex 13 | A7(2E) | C6(2E) | MB1(2) | 3D | 5.72 | 1.783 | 1.11 | 10.898 | 6.112 | 5.15 | C(+++) |
| ex 14 | A7(2E) | C6(2E) | MB1(2) | 3D | 5.72 | 1.783 | 1.37 | 10.405 | 5.836 | 4.18 | C(+++) |
| ex 15 | A7(2E) | C6(2E) | MB1(2) | 3D | 4.81 | 1.887 | 0.79 | 12.783 | 6.774 | 6.09 | C(+++) |
| ex 16 | A7(2E) | C6(2E) | MB1(2) | 3D | 4.81 | 1.887 | 1.61 | 9.958 | 5.277 | 2.99 | C(++) |
| ex 17 | A7(2E) | C6(2E) | MB1(2) | 3D | 3.95 | 1.979 | 0.63 | 13.812 | 6.979 | 6.27 | C(+++) |
| ex 18 | A7(2E) | C6(2E) | MB1(2) | 3D | 3.95 | 1.979 | 0.98 | 11.976 | 6.052 | 4.03 | C(++) |
| ex 19 | A7(2E) | C6(2E) | MB1(2) | 3D | 3.66 | 2.085 | 0.34 | 16.021 | 7.684 | 10.76 | C(+++) |
| ex 20 | A7(2E) | C6(2E) | MB1(2) | 3D | 3.66 | 2.085 | 0.79 | 12.783 | 6.131 | 4.63 | C(+++) |
| ex 21 | A7(2E) | C6(2E) | MB1(2) | 3D | 3.24 | 2.211 | 0.17 | 18.886 | 8.542 | 19.06 | C(+) |
| ex 22 | A7(2E) | C6(2E) | MB1(2) | 3D | 3.24 | 2.211 | 0.34 | 16.021 | 7.246 | 9.53 | C(+++) |

The invention claimed is:

1. A multilayer blow-molded hollow article comprising at least an outside layer and an inside layer comprising thermoplastic polymers, optionally one or more layers located between the outside layer and the inside layer, wherein both the outside layer and the inside layer have only one of their two principal surfaces directly adhered to another layer of the article, wherein any middle layer has both of its principal surfaces directly adhered to another layer of the article, wherein at least one of the layers is a uniform continuous layer with a uniform degree of thickness in both a longitudinal and circumference direction, wherein at least one of the layers is a non-uniform continuous layer with varying degrees of thickness that includes variations in both circumferential thickness and longitudinal thickness, resulting in a visual surface pattern effect of areas with elevations, cavities, grooves, ridges, streaks or swirls, and/or a visual color effect of streaks, waves and/or swirls caused by varying color or translucency, and wherein a ratio of dynamic viscosity of the thermoplastic polymer forming the non-uniform layer to the thermoplastic polymer forming the uniform layer is in the range of from 9.0 to 4.0.

2. The article of claim 1, wherein the uniform continuous layer has a thickness of between 0.1 to 5 mm.

3. The article of claim 1, wherein the thermoplastic polymers are selected from the group consisting of polyolefins, polyolefin copolymers, polystyrenes and combinations thereof.

4. The article of claim 1, wherein the thermoplastic polymers are selected from the group consisting of high density polyethylene, medium density polyethylene, linear low density polyethylene, polypropylene homopolymer, polypropylene random copolymer and combinations thereof.

5. The article of claim 1, wherein any layer contains one or more colorants.

6. The article of claim 1, wherein the article is a two-layer article and wherein the outside layer is the uniform continuous layer and the inside layer is the non-uniform continuous layer.

7. The article of claim 1, wherein the article is a two-layer article and wherein the outside layer is the non-uniform continuous layer and the inside layer is the uniform continuous layer.

8. The article of claim 1, further comprising a middle layer, wherein the outside layer is the uniform continuous layer and the middle layer and the inside layer are non-uniform continuous layers.

9. The article of claim 1, further comprising a middle layer, wherein the outside layer and the inside layer are non-uniform continuous layers and the middle layer is the uninform continuous layer.

10. The article of claim 1, wherein non-uniform layer thickness is either continuous and varies along the circumference and along the longitudinal direction of the non-uniform layer of the article, or the non-uniform layer thickness is discontinuous and becomes zero at one or more parts along the circumference and along the longitudinal direction of the non-uniform layer of the article and is interrupted by any of the other layers of the article.

11. A multilayer blow-molded hollow article comprising at least an outside layer and an inside layer comprising thermoplastic polymers,
optionally one or more layers located between the outside layer and the inside layer,
wherein both the outside layer and the inside layer have only one of their two principal surfaces directly adhered to another layer of the article,
wherein any middle layer has both of its principal surfaces directly adhered to another layer of the article,
wherein at least one of the layers is a uniform continuous layer with a uniform degree of thickness in both a longitudinal and circumference direction,
wherein at least one of the layers is a non-uniform continuous layer with varying degrees of thickness that includes variations in both circumferential thickness and longitudinal thickness, resulting in a visual surface pattern effect of areas with streaks or swirls, and/or a visual color effect of streaks, waves and/or swirls caused by varying color or translucency, and
wherein the article is prepared by coextrusion blow-molding in two consecutive steps, where in the first step an at least two-layer tubular parison is formed by coextrusion of at least two different thermoplastic polymers from a multilayer coextrusion die head whereby (i) the polymer forming a continuous layer with a uniform degree of thickness has a lower dynamic viscosity when passing through the coextrusion die head than the polymer forming a discontinuous or a nonuniform continuous layer; and (ii) the polymer forming a continuous layer with a uniform degree of thickness is extruded at a higher extrusion rate than the polymer forming a discontinuous or a non-uniform continuous layer, and in the second step, said parison is blow-molded to form the multilayer polymeric hollow article.

12. The article as claimed in claim 11, wherein the ratio of dynamic viscosity of the polymer forming the non-uniform continuous layer to the dynamic viscosity of the polymer forming the uniform continuous layer, when passing through the die head, is of from 9.0 to 4.0.

13. The article as claimed in claim 12, wherein the ratio of dynamic viscosity is of from 7.7 to 4.6.

14. The article as claimed in claim 11, wherein the rate of extrusion of the polymer forming the uniform continuous layer to the rate of extrusion of the polymer forming the non-uniform continuous layer is of from 30.0 to 2.5.

15. The article as claimed in claim 14, wherein the rate of extrusion is of from 8.9 to 4.2.

16. The article as claimed in claim 11, wherein the thermoplastic polymers are selected from the group consisting of polyolefins, polyolefin copolymers and polystyrenes.

17. The article of claim 1, wherein the non-uniform continuous layer with varying degrees of thickness results in a visual surface pattern effect of areas with streaks or swirls, and/or a visual color effect of streaks, waves and/or swirls caused by varying color or translucency.

* * * * *